No. 707,304. Patented Aug. 19, 1902.
T. & W. H. COLDWELL.
MOTOR LAWN MOWER.
(Application filed Mar. 7, 1902.)
(No Model.) 4 Sheets—Sheet 1.
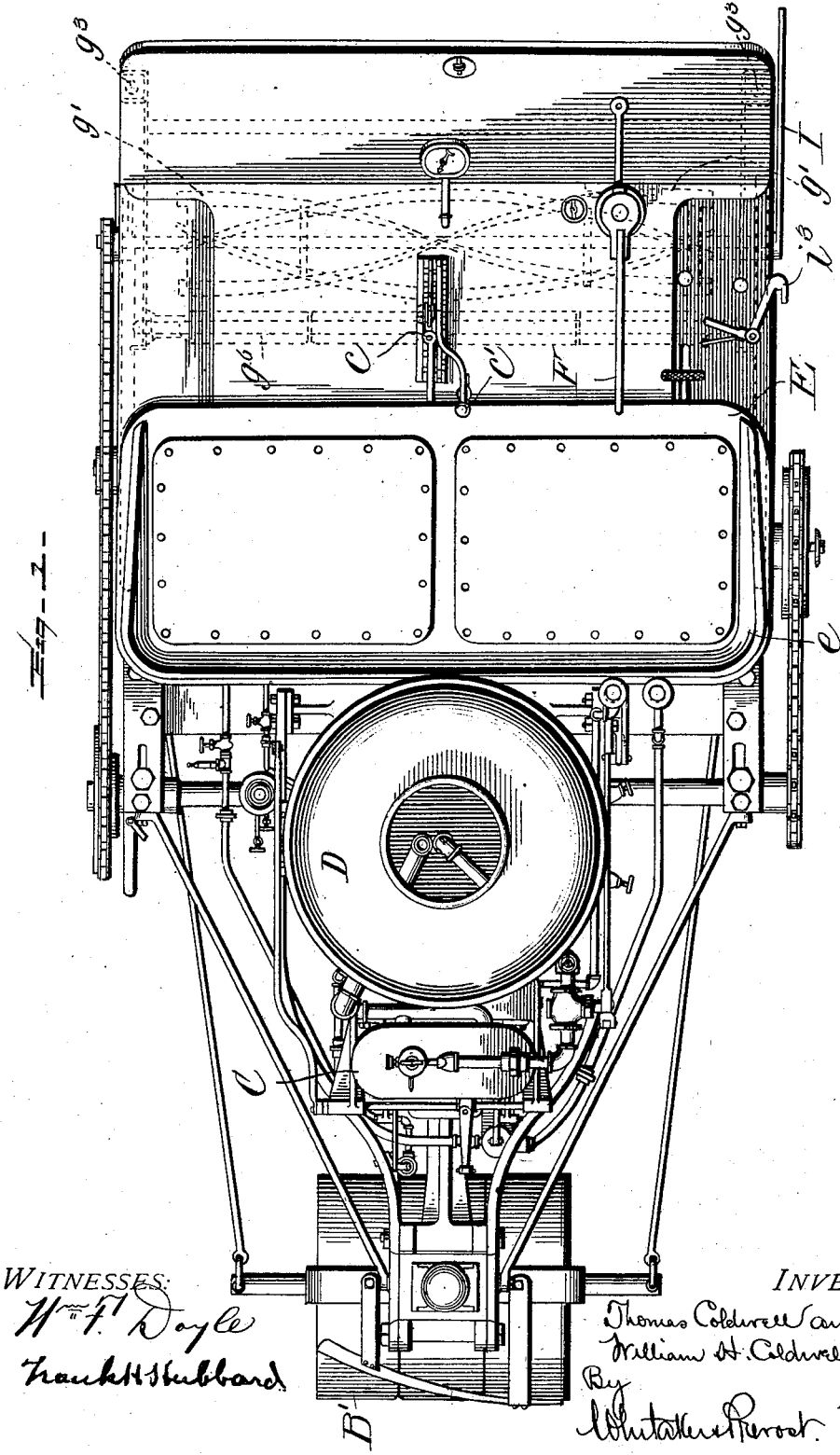

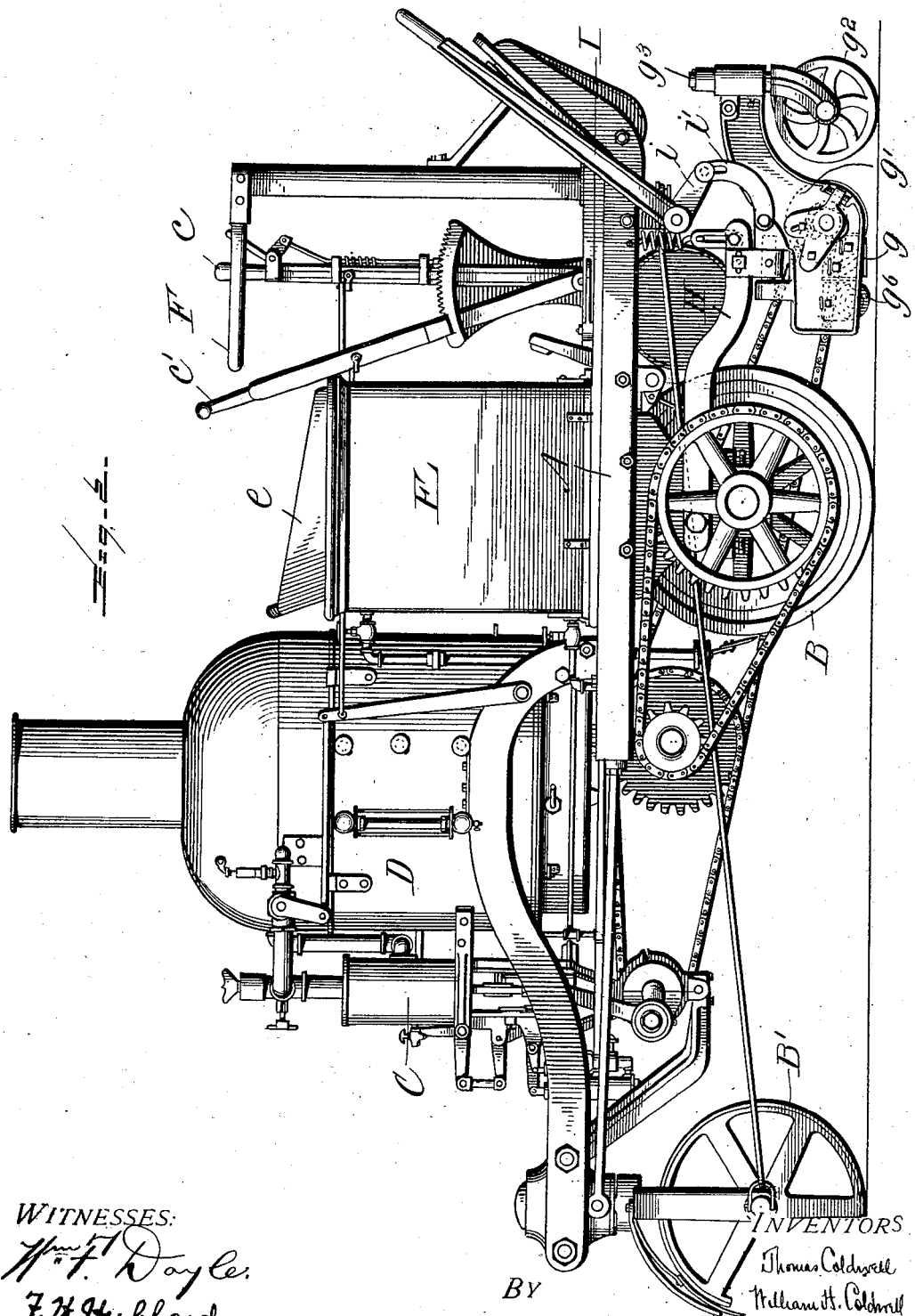

No. 707,304. Patented Aug. 19, 1902.
T. & W. H. COLDWELL.
MOTOR LAWN MOWER.
(Application filed Mar. 7, 1902.)
(No Model.) 4 Sheets—Sheet 3.
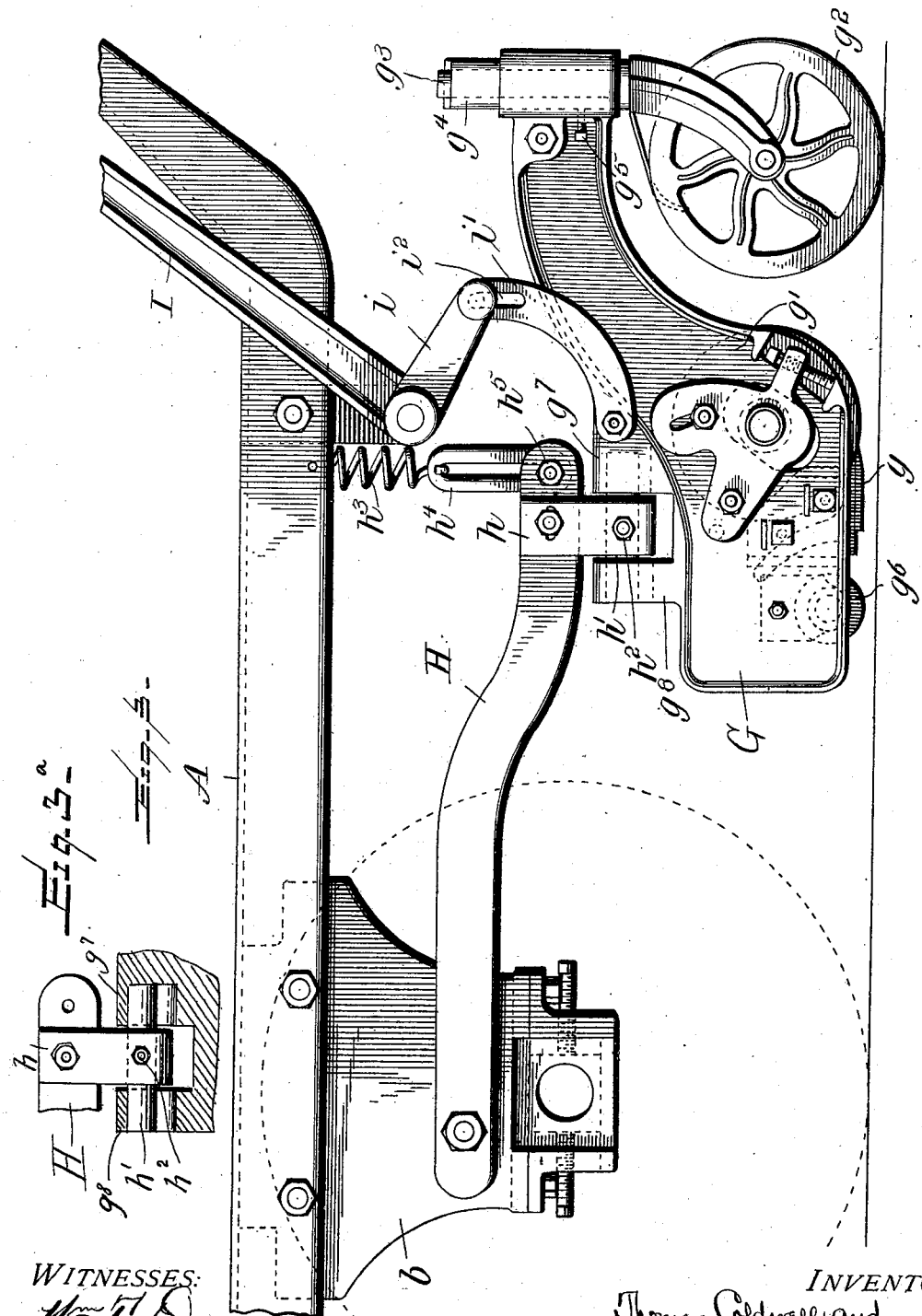
WITNESSES:
INVENTORS
Thomas Coldwell and
William H. Coldwell
BY
Attorneys

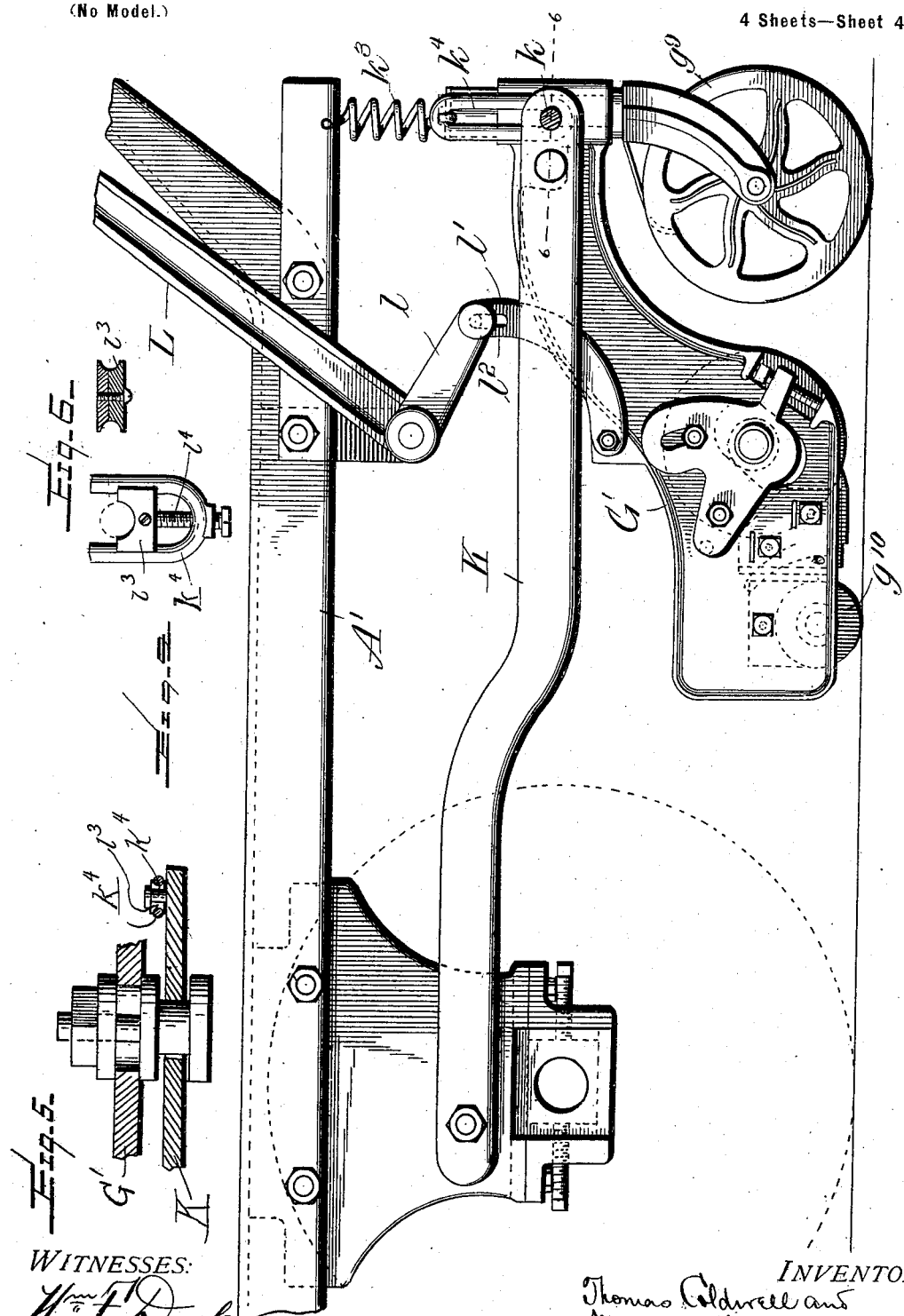

UNITED STATES PATENT OFFICE.

THOMAS COLDWELL AND WILLIAM H. COLDWELL, OF NEWBURGH, NEW YORK.

MOTOR LAWN-MOWER.

SPECIFICATION forming part of Letters Patent No. 707,304, dated August 19, 1902.

Application filed March 7, 1902. Serial No. 97,095. (No model.)

*To all whom it may concern:*

Be it known that we, THOMAS COLDWELL and WILLIAM H. COLDWELL, citizens of the United States, residing at Newburgh, in the county of Orange and State of New York, have invented certain new and useful Improvements in Motor Lawn-Mowers; and we do hereby declare the following to be a full, clear, and exact description of the invention, such as will enable others skilled in the art to which it appertains to make and use the same.

Our invention consists in the novel features hereinafter described, reference being had to the accompanying drawings, which illustrate one form in which we have contemplated embodying our invention and a slight modification thereof, and said invention is fully disclosed in the following description and claims.

Referring to the drawings, Figure 1 is a top plan view of a motor lawn-mower embodying our invention. Fig. 2 is a side elevation of the same. Fig. 3 is an enlarged side elevation of the cutter-frame and its connections with the motor-frame. Fig 3ª is a detail showing the manner of connecting the push-bars and cutter-frame. Fig. 4 is a similar view showing a modified form of apparatus for carrying our invention into effect. Fig. 5 is a detail view showing the manner of connecting the push-bars with the cutter-frame in this construction, and Fig. 6 is a detail of the means for adjusting the springs.

In the practical use of motor lawn-mowers it is necessary to provide the frame carrying the cutter mechanism with ground-engaging devices, which run upon the surface of the sod and regulate the height of cut of the machine. It is also very desirable to locate such ground-engaging devices forward of the transverse line of cut of the cutting mechanism, for the purpose of preventing the cutters from digging into the sod in passing over inequalities of the ground to the detriment of the cutting mechanism and also of the lawn. These ground-engaging devices, which of necessity run in the high grass either in front of or at one side of the cutting mechanism, in practice support all or a large part of the entire weight of the cutter-frame. This construction is open to two objections: First, the ground-engaging devices are forced into the sod, especially if the latter is at all damp, making unsightly ridges, which greatly mar a lawn, and, secondly, where they run in the tall grass they press the latter down, thereby preventing it from being properly presented to the cutting mechanism, and thus leaving lines of grass extending across a lawn of greater height than surrounding portions.

The object of our invention is to provide a construction which will obviate these objectionable features. We accomplish this result by supporting substantially the entire weight of the cutter-frame or the front portion thereof at all times from the motor-carrying frame to which the cutter-frame is connected by springs or counterbalance-weights, so that the said ground-engaging devices will rest upon the sod with a very light pressure, thereby entirely preventing them from cutting the sod or materially depressing the long grass through which they may pass.

Referring to the drawings, A represents the motor-carrying frame, which is provided adjacent to one end with combined traction and lawn-rolling rollers B B and adjacent to the other end with a steering-roller B', which is also a lawn-rolling roller. The motor-frame, as will be seen, is entirely self-supporting and is provided with a suitable motor for propelling it over the ground, in this instance a steam-engine C.

D represents the boiler; E, the water-tank, upon which is located the driver's seat *e*.

F represents the steering-lever, and *c c'* the levers for controlling and reversing the engine. The engine is connected by suitable gearing—in this instance sprocket-gearing—with the traction-rollers B B through the intervention of the usual compensating gear. (Not shown.)

The particular construction of the motor and its connections forms no part of our present invention, and therefore will not be particularly described herein, as any other form of motor may be substituted for the steam-engine shown.

In front of and in line with the motor-frame A is the cutter-frame, which is entirely separate from the motor-frame and consists of side frames G G, suitably connected and provided with the stationary cutter $g$ and rotary cutter or "wiper" $g'$, as is customary in lawn-mowers. The front end of each side frame is provided with a vertically-adjustable caster-wheel $g^2$, having its pivotal stem $g^3$ mounted pivotally in a vertically-adjustable block $g^4$, mounted in a vertical guide in the side frame and held in its adjusted position in this instance by a set-screw $g^5$. The rear ends of the side frames G are preferably provided with a guard-roller $g^6$, which does not normally engage the ground, but serves to prevent the knives or cutters from digging into the sod in case the front rollers of the motor-frame should run into a deep depression in the sod. Substantially the entire weight of the cutter-frame is supported at all times by the front portion of the motor-frame, and the connections between said frames are so constructed as to permit the two frames to rock transversely and also longitudinally with respect to each other to accommodate them to the inequalities of the ground.

In the construction illustrated in detail in Fig. 3 the motor-frame is provided on each side with a supporting and pushing bar H, pivotally connected to the motor-frame, in this instance to the hanger or bearing $b$ for the shaft of the traction-rollers B B. At or near its forward end each of these push-bars is provided with a downwardly-extending lug $h$, bolted to said bar, the bolt-hole in the lug being elongated transversely to permit of adjustment, the lower end of said lug $h$ being provided with an aperture in which is located a supporting-pin $h'$, secured therein by a set-screw $h^2$. The forward end of each push-bar H is further provided with an adjustable lifting or supporting spring $h^3$, secured at its upper end to the motor-frame, the lower end of said spring being preferably provided with a slotted plate or link $h^4$, engaged by a clamping-bolt $h^5$, passing therethrough and through the push-bar H to permit of the adjustment of the tension of the spring $h^3$. Each of the side frames G G of the mower or cutter frame is provided with perforated lugs $g^7$ $g^8$, which receive the ends of the supporting-pin $h'$, the apertures in the said lugs being elongated vertically to permit of a limited amount of play of the said pin $h'$ in said apertures, so that the cutter-frame and mower-frame can rock longitudinally with respect to each other, and this connection also permits the two frames to rock transversely with respect to each other by reason of the yielding connection between the motor-frame and cutter-frame at each side. The springs $h^3$ are so adjusted as to support substantially the entire weight of the cutter-frame from the mower-frame, so that the ground-engaging devices of the cutter-frame—to wit, the caster-wheels—bear upon the ground with only sufficient pressure to keep them in contact therewith, so as to regulate the height of cut, and said ground-engaging devices are therefore prevented from cutting into the ground or pressing down the tall grass forward of or at the side of the cutters. We also provide devices for lifting the cutter-frame bodily out of operative position and supporting it entirely from the motor-frame when the cutting devices are not required, consisting in this instance of a hand-lever I, pivotally connected with the motor-frame and provided with an arm $i$, connected by a link $i'$ to the cutter-frame, as clearly shown in Fig. 3, the said link being slotted, as shown at $i^2$, where it connects with the arm $i$, so as not to interfere with the longitudinal and transverse movements of the frames with respect to each other. When the cutter-frame is thus lifted entirely from the ground, the machine can be used as a road or lawn roller or may be propelled from one place to another without operating the cutting mechanism. The rotary cutter is driven by a sprocket-chain from the motor in a well-known way, and suitable means (not shown) are provided for throwing the rotary cutter into and out of operation.

In Fig. 4 we have shown a slight modification of our invention in which substantially all the weight of the cutter-frame is transferred from the front part of the cutter-frame and the caster-wheels, a portion of the weight of the cutter-frame when in operation being supported by the guard-roller in rear of the cutters. In this form of our invention the push-bars K are extended forwardly and are pivotally (and loosely) connected to the front portions of the side frames G' of the cutter-frame, as shown, the connections being sufficiently loose to permit the motor-frame and cutter-frame to rock transversely with respect to each other, the pivotal connections permitting them to rock longitudinally with respect to each other. We make this loose connection conveniently by making the holes in the push-bars K larger than the pivot-bolts $k$ passing through the said holes. The cutter-frame is provided with vertically-adjustable caster-wheels $g^9$, constructed exactly as previously described, to regulate the height of cut, and said frame is also provided with the guard-roller $g^{10}$ in rear of the cutters, which roller in this instance runs on the ground and supports a portion of the weight of the rear part of the cutter-frame. $k^3$ represents one of the springs for supporting substantially all the weight of the front portion of the cutter-frame, said springs being connected at their upper ends to the motor-frame and being provided at their lower ends with slotted plates or links $k^4$, secured adjustably to the bars K K, as shown in Figs. 5 and 6, or to the side bars of the cutter-frame, as preferred. The link $k^4$ is secured to the bar K by the screw or bolt $k$ passing through it, and the adjustment is in this instance provided for by the sliding block $l^3$ (see Fig. 6) and the screw $l^4$ for moving it. The block $l^3$ is here shown as made in two pieces united by a screw. In this figure we have also shown a lifting-lever L for the cutter-frame, having an arm $l$, connected by a link $l'$, slotted at $l^2$, with the cutter-frame, for raising said frame bodily out of operative position when desired. In this form of our invention the springs $k^3$ are so adjusted as to transfer substantially the entire weight from the caster-wheels $g^9$ to the motor-frame for the purposes hereinbefore fully set forth. It is to be understood that the springs connected to the motor-frame are either directly or indirectly connected with the cutter-frame and that the two constructions are included in the foregoing description and in the following claims.

We do not limit ourselves to the exact details of construction herein shown and described, as variations may be made therein without departing from the spirit of our invention.

What we claim, and desire to secure by Letters Patent, is—

1. The combination with a motor-carrying frame, provided with traction and lawn-rolling rollers, supporting said frame, of a cutter-frame, located in front of the said traction and lawn-rolling rollers and provided with cutting mechanism and with ground-engaging devices in constant engagement with the ground when the cutter is in operation for regulating the height of the cut, devices for raising the said cutter-frame for transportation from place to place, and connections between the motor-frame and cutter-frame for transferring substantially the whole weight of the cutter-frame when in operative position to the motor-frame, to add to the effectiveness of the traction-rollers, substantially as described.

2. The combination with a motor-carrying frame provided with traction and lawn-rolling rollers, supporting said frame, of a cutter-frame arranged in front of the said traction and lawn-rolling rollers and provided with cutting mechanism and ground-engaging devices in constant engagement with the ground when the cutter is in operation for regulating the height of cut, devices for enabling the operator to raise said cutter-frame out of operative position at will, and means connected to the motor-frame for supporting substantially the whole weight of the cutter-frame from said motor-frame when the said cutter-frame is in operative position, whereby the ground-engaging devices are prevented from cutting the sod or materially depressing the long grass, substantially as described.

3. The combination with a motor-carrying frame provided with traction and lawn-rolling rollers, supporting said frame, of a cutter-frame arranged in front of the said traction and lawn-rolling rollers, and provided with cutting mechanism and with ground-engaging devices for regulating the height of cut, connections between said frame permitting them to rock transversely with respect to each other, devices enabling the operator to raise the cutter-frame at will, and means connected to the motor-frame for supporting substantially the whole weight of the cutter-frame when the said cutter-frame is in operative position whereby the efficiency of the traction-rollers is increased and the ground-engaging devices of the cutter-frame are prevented from cutting the sod, substantially as described.

4. The combination with a motor-carrying frame provided with traction and lawn-rolling rollers supporting said frame of a cutter-frame arranged in front of said traction and lawn-rolling rollers and provided with cutting mechanism and with ground-engaging devices for regulating the height of cut, connections between said frames permitting them to rock transversely in respect to each other, devices enabling the operator to raise the cutter-frame at will, and means connected to said motor-frame and to said cutter mechanism forward of the line of cut, for transferring substantially the whole weight from the ground-engaging devices to the motor-frame, substantially as and for the purposes set forth.

5. The combination with a motor-carrying frame provided with traction and lawn-rolling rollers entirely supporting said frame, of a cutter-frame located in front of the said traction and lawn-rolling rollers and provided with cutting mechanism and with ground-engaging devices for regulating the height of cut, push-bars connected to the said motor-frame and to said cutter-frame for propelling the cutter-frame, means for enabling the operator to raise said cutter-frame, and springs connected to the motor-frame and supporting substantially the entire weight of the said cutter-frame from the said motor-frame, substantially as described.

6. The combination with a motor-carrying frame provided with traction and lawn-rolling rollers entirely supporting said frame, of a cutter-frame arranged in front of the traction and lawn-rolling rollers, provided with cutting mechanism and with ground-engaging devices forward of the transverse line of cut for regulating the height of cut, push-bars pivoted to said motor-frame and to said cutter-frame, said connections permitting the said frames to rock transversely and longitudinally in respect to each other, means enabling the operator to raise the cutter-frame at will, and springs connecting said push-bars and motor-frame for transferring substantially the entire weight of the cutter-frame from the ground-engaging devices to the motor-frame, substantially as described.

7. In a lawn-mower, the combination with the motor-frame provided with traction and lawn-rolling rollers entirely supporting said frame, of a cutter-frame arranged in front of the said traction and lawn-rolling rollers and provided with ground-engaging devices forward of the transverse line of cut to regulate the height of cut, push-bars connecting the motor-frame and cutter-frame, means for enabling the operator to raise the cutter-frame at will, and springs connecting the motor-frame with the cutter-frame and acting to lift the forward part of the cutter-frame and supporting substantially the entire weight of the cutter-frame, substantially as described.

8. In a motor lawn-mower, the combination with the motor-frame provided with traction and lawn-rolling rollers, entirely supporting said frame, of a cutter-frame arranged in front of said rollers and provided with ground-engaging devices forward of the transverse line of cut to regulate the height of cut, push-bars connecting the said motor-frame and cutter-frame, the connections between said push-bars and the motor and cutter frames permitting said frames to rock transversely and longitudinally with respect to each other, means for enabling the operator to raise the cutter-frame at will and springs connecting the motor-frame with the cutter-frame for supporting substantially the entire weight of the said cutter-frame, substantially as described.

9. In a motor lawn-mower, the combination with the motor-frame provided with traction and lawn-rolling rollers entirely supporting said frame, of a cutter-frame arranged in front of said rollers and provided with cutting mechanism and with ground-engaging devices for regulating the height of cut, connections between said frames for propelling the cutter-frame from the motor-frame, means for enabling the operator to raise the cutter-frame at will, springs connecting the motor-frame with the cutter-frame and arranged to transfer substantially all of the weight from the cutter-frame ground-engaging devices, means for adjusting the tension of said springs, and means for adjusting said ground-engaging devices with respect to the cutter-frame, substantially as described.

10. In a motor lawn-mower, the combination with the motor-frame provided with traction and lawn-rolling rollers entirely supporting said frame, of a cutter-frame arranged in front of said rollers and provided with ground-engaging devices forward of the transverse line of cut to regulate the height of cut and a guard-roller in rear of the line of cut, push-bars pivoted to the motor-frame and provided at their forward ends with pins disposed longitudinally of said bars, said cutter-frame being provided with parts having vertically-elongated apertures to receive said pins, and springs for supporting substantially the entire weight of said cutter-frame, substantially as described.

In testimony whereof we affix our signatures in the presence of two witnesses.

THOMAS COLDWELL.
WILLIAM H. COLDWELL.

Witnesses:
L. P. WHITAKER,
FRANK H. HUBBARD.